UNITED STATES PATENT OFFICE.

LEON VAN DEN STEEN, OF LAEKEN, BRUSSELS, BELGIUM.

COMPOSITION FOR ARTIFICAL MARBLE.

SPECIFICATION forming part of Letters Patent No. 386,039, dated July 10, 1888.

Application filed September 16, 1887. Serial No. 249,828. (No specimens.) Patented in Belgium May 18, 1886; in Russia October 11 and 23, 1886; in France January 6, 1887; in Austria-Hungary January 8, 1887, and in Italy January 19, 1887.

*To all whom it may concern:*

Be it known that I, LEON VAN DEN STEEN, of Laeken, Brussels, in the Kingdom of Belgium, have invented a new and useful Improvement in Artificial Marble and the Process of Manufacturing and Applying the Same, (which invention has been patented in Russia, October 11 and 23, 1886; France, January 6, 1887; Austria-Hungary, January 8, 1887; Italy, January 19, 1887, and Belgium, May 8, 1886;) and I hereby declare the following to be a full, clear, and exact description of the same.

My invention relates to artificial marble and to the modes of manufacturing and applying the same.

The invention consists in an artificial marble composed of common plaster-of-paris or gypsum, glue, turpentine, and rosin, colored with mineral or vegetable colors.

The invention also consists in the mode of manufacturing the article mentioned, all as I will now proceed to fully describe and claim.

In carrying out my invention I first dissolve a quantity of glue in hot water and a quantity of rosin in turpentine steeped in a hot-water bath. I then take a quantity of plaster-of-paris or gypsum and mix it with the glue, rosin, turpentine, and water, prepared as aforesaid, until the plaster is reduced to the desired consistency, when I add to the mass the tints or shades of color in accordance with the kinds of imitation marble I wish to produce. I then pour or spread the mass thus prepared on a table of plate-glass, stone, or any other material for forming flat surfaces, or in molds of plaster, or any other material for forming projecting objects, or objects in relief, the plaster being poured or spread upon the flat surfaces or in the molds, preferably to a depth of about five-sixteenths of an inch. I then sift over the mass a quantity of dry powdered plaster to absorb the superfluous water used in mixing the plaster. When the plaster sifted on the mass becomes quite moistened, I line or "back" the marble coat, formed as aforesaid, by plastering thereon or applying thereto a mixture of plaster and pounded stone or bricks and the dissolved glue, turpentine, rosin, and water mentioned above, which "backing" I make as thick as the circumstances may require. When the material thus formed is thoroughly "set," which is about six or eight hours after the casting, I remove it from the mold or slab or table on which it is formed and subject it to pumicing or stoning, and fill in holes or imperfections with material prepared in accordance with that forming the marble face.

To harden or render water-proof the lining or backing of the marbled face or coat, I heat said backing with a solution of silicate of potassium, either by steeping it in a bath of this solution or applying the solution thereto with a brush.

For covering concave or convex or other surfaces—such as columns, walls of round staircases, niches, moldings, &c.—with my improved artificial marble, I proceed as follows: After having formed the desired shape to the surface of the article to which my improved artificial marble is to be applied with common plaster-of-paris, being sure to leave room—say five-sixteenths of an inch in depth—for the marble coat, I spread upon a smooth table, either of stone, plate-glass, or the like, a sheet of enameled cloth, water-proof glazed paper, or the like, and pour or spread upon this cloth or glazed paper a coat about five-sixteenths of an inch in thickness of my improved compound in a plastic state, prepared as before described, and while in a plastic state I lift the mass, with the cloth or paper upon which it is spread, and apply it to the surface to be covered, and as soon as it adheres thereto with sufficient closeness I remove the cloth or paper. The size of the cloth or paper upon which the marbled coat is to be spread is suited to the size of the surface or space to be covered.

The quantity of glue and rosin used in the water and turpentine, with which the plaster is mixed, is varied according to whether it is desired to have the compound set quickly or slowly.

After the article thus formed has become thoroughly set and dried, I polish it with a compound, and in accordance with a process which will form the subject of a separate application.

By my improvement a perfect imitation of marble can be easily and cheaply produced and applied to any desired object.

What I claim is—

1. A composition forming artificial marble, consisting of plaster-of-paris or gypsum and a liquid compound of glue, rosin, turpentine, and water, substantially as set forth.

2. A composition forming artificial marble, consisting of plaster-of-paris or gypsum, glue, rosin, turpentine, a coloring-matter, and water, substantially as described.

In witness whereof I hereunto set my hand in presence of two witnesses.

LEON VAN DEN STEEN.

Witnesses:
VICTOR DIEGHENS,
ADOLPH STEIN.